(No Model.)

C. OWENS.
BUTTER WORKER.

No. 511,274. Patented Dec. 19, 1893.

WITNESSES
F. L. Ourand.
Edwin McKee.

INVENTOR
Charles Owens,
By Cyrus H. Rice Attorney

UNITED STATES PATENT OFFICE.

CHARLES OWENS, OF WARREN COUNTY, ILLINOIS.

BUTTER-WORKER.

SPECIFICATION forming part of Letters Patent No. 511,274, dated December 19, 1893.

Application filed June 9, 1891. Serial No. 395,733. (No model.)

*To all whom it may concern:*

Be it known that I, CHARLES OWENS, a citizen of the United States, residing in the county of Warren, State of Illinois, have invented a certain new and useful Improved Butter-Worker, of which the following is a specification, which will enable others skilled in the art to which it belongs to make and use the same, reference being had to the accompanying drawings, and to the letters of reference marked thereon, which form a part of this specification.

My invention has reference to butter workers,—those machines by which butter is reduced to proper condition by expressing the impurities, &c.; and the nature of my invention and its principle consist in the construction of a butter worker comprising a cylindrical vessel closed at the ends, and a roller inside the vessel and near the side of it with its axis parallel with the axis of the vessel, or nearly so, both the vessel and roller revoluble about their respective axes, by means of which motion the butter is compressed again and again between the roller and the side of the vessel nearest thereto, thus expressing the watery impurities, &c.

This my invention I embody in the novel features of construction and arrangement shown in the following described mechanism, and the object of the invention is attained thereby.

Figure 1:
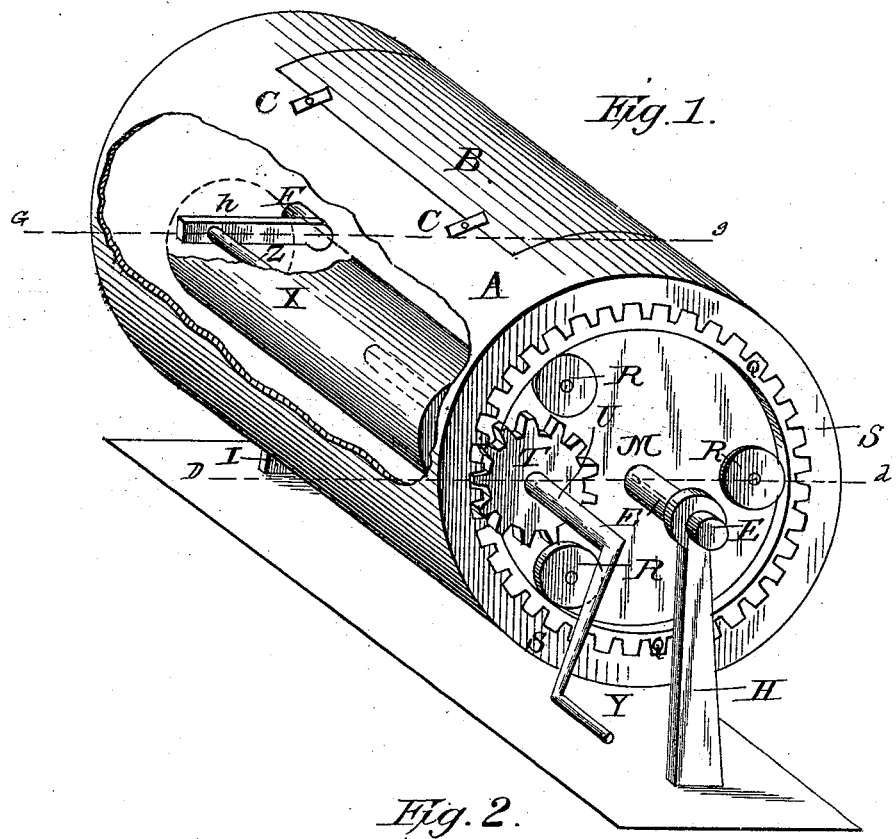
Figure 2:
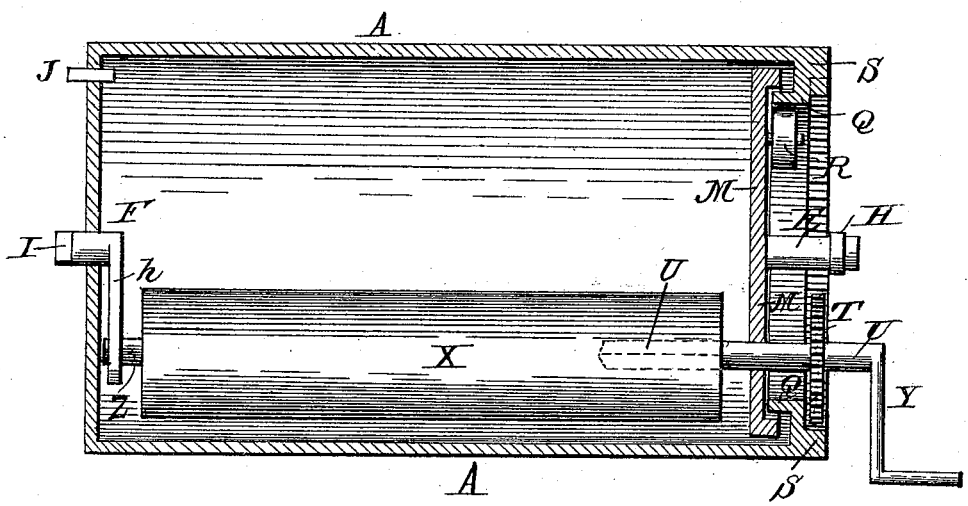

In the annexed drawings, Figure 1 represents a general view of my butter worker, with part of the side of the vessel removed to show the interior; also with part of the roller X removed. Fig. 2 represents a section of the vessel A on the line of the axes of the vessel A and roller X, which line is indicated in Fig. 1, by the broken lines G, g and D, d.

The cylindrical vessel A has a suitable opening for putting in the butter, &c., which is closed by the tight cover B. This cover may of course be fastened in any suitable manner, as by means of the buttons C. One end of the vessel A, marked M on the drawings, remains stationary, supported by the standard H to which it is connected by the rod E. The rest of the vessel A revolves, turning on the spindle F (which spindle F is supported by the standard I, and remains stationary) and the friction wheels R fixed upon the head M, which friction wheels R travel on the inside of the ring Q, which ring Q retains the head M in position and prevents it from coming out. The vessel A has the ring S attached to the main part of the vessel or to the ring Q and concentric with the head M, the inside of which ring S has teeth into which mesh the teeth of the cogwheel T. The head M has a perforation in which turns the shaft U as in a journal box. The spindle F supports, inside the vessel A, an arm $h$, which has a perforation or journal box in which turns the shaft Z in one end of the roller X. The other end of the roller X has a square aperture in its center to admit the squared part of the shaft U by which the roller X is rotated. By means of this arrangement the roller X may be removed from the vessel for purposes of cleaning, &c., by withdrawing the shaft U with its cogwheel T. The motive power of the shaft U is applied in any suitable manner as by the crank Y. There is a suitable opening through the vessel by means of which the water, &c., may be drained out. This opening is closed by a suitable stopper J. When the crank Y is turned, the roller X and vessel A are revolved in the same direction, the head M remaining stationary. The butter is compressed again and again between the roller and the nearest side of the vessel.

I am aware that butter workers are known consisting of a cylindrical drum, open at the end, and I do not claim to be the inventor of such butter worker; but in my butter worker the vessel containing the butter is closed, being thus more cleanly.

The subject-matter of this application is also shown in my application relating to a combined churn and butter worker, Serial No. 472,640, filed May 1, 1893, but of course is not claimed therein.

Having now carefully described my invention, what I claim as new, and desire to secure by Letters Patent, is—

1. In a butter worker, the rotatable vessel A closed at one end, the stationary disk M constructed to close its other end and about which the vessel revolves, and the rotatable worker or roll X having one end journaled eccentrically in said disk, substantially as described.

2. A butter worker comprising a rotatable vessel A closed at one end, a stationary disk M constructed to close its other end and about which the vessel revolves, the rotatable worker or roll X having one end journaled eccentrically in said disk, and means for transmitting motion from the roll to the vessel so that the latter may be rotated by the movement of the former, or vice versa, substantially as described.

3. A butter worker comprising a rotatable vessel A closed at one end, a stationary disk M constructed to close its other end and about which the vessel revolves, the rotatable worker or roll X having one end journaled eccentrically in said disk, and means for transmitting motion from the roll to the vessel so that the latter may be rotated by the movement of the former, or vice versa, consisting of the gear S on the vessel and the gear or pinion T on the shaft of roll X meshing with gear S, substantially as described.

4. In a butter worker, the combination with a revoluble cylindrical body closed at one end, of the stationary disk adapted to close the other end, friction wheels carried by said disk, an annular ring carried by the cylindrical body and adapted to bear upon the friction wheels, and devices for revolving the body, substantially as described.

5. A butter worker comprising the vessel A having ring Q, the head M of separate piece from the rest of the vessel and provided with the friction wheels R engaging the inner side of ring Q, the toothed ring S, the roller X having the shaft Z revoluble in a journal box supported by means of the spindle F, the said spindle and the revoluble shaft U provided with the cogwheel T, all constructed substantially as and for the purpose herein described.

In testimony that I claim the foregoing as my own I affix my signature in presence of two witnesses.

CHARLES OWENS.

Witnesses:
W. L. HOPPER,
H. C. HOPPER.